July 15, 1969    J. S. BRADLEY    3,455,144
APPARATUS FOR DETECTING HYDROCARBON GAS IN SEA WATER
Filed Oct. 9, 1967
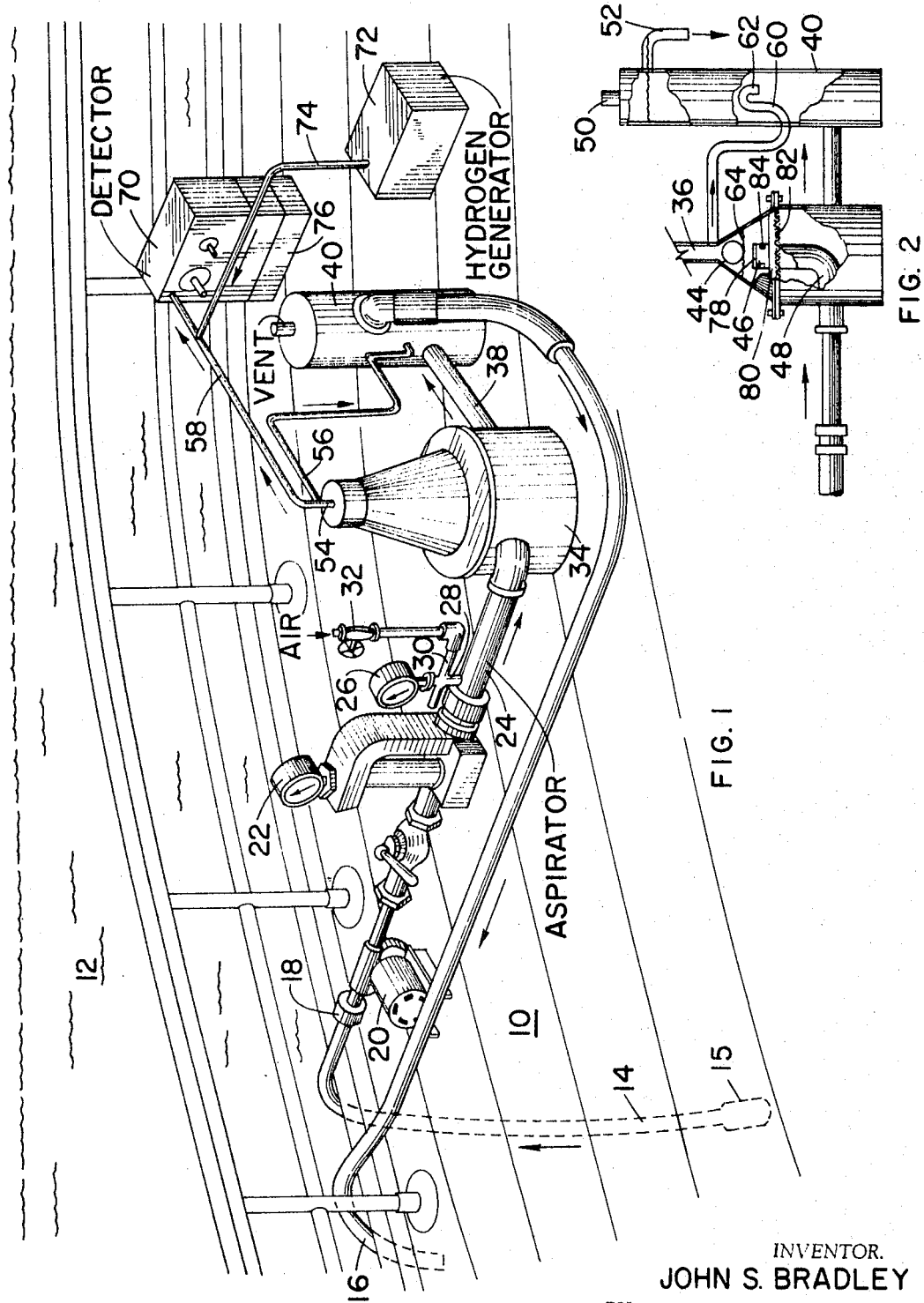
INVENTOR.
JOHN S. BRADLEY
BY
John D. Gassett
ATTORNEY 3,455,144
APPARATUS FOR DETECTING HYDROCARBON
GAS IN SEA WATER
John S. Bradley, Tulsa, Okla., assignor to Pan American
Petroleum Corporation, Tulsa, Okla., a corporation of
Delaware
Filed Oct. 9, 1967, Ser. No. 673,697
Int. Cl. G01n 7/06, 31/12
U.S. Cl. 73—19   12 Claims

ABSTRACT OF THE DISCLOSURE

This describes improved marine seep equipment for detecting the presence of gas, especially methane, in sea water. A sample of sea water is continuously passed through a gas breakout portion of the system. This gas breakout portion includes an aspirator for creating a high vacuum in the flowing sample of sea water to cause dissolved gases in the sea water to break out in the form of small bubbles. The water having the small bubbles is fed to a separator where the gas rises to the top and the degassed water flows out the bottom. The degassed water flows into a standpipe which has an outlet higher than the separator. The separator has a gas sample outlet which goes to a flame ionization detector. A bypass is connected from the gas sample outlet to a goose neck stinger in the standpipe. The stinger goose neck level in the standpipe controls the water level in the separator. The level may be adjusted by moving the goose neck up or down.

---

This invention relates to an apparatus for exploring for hydrocarbon deposits over water covered areas. More particularly, the present invention relates to means of detecting the presence of hydrocarbon gas, e.g., methane, in samples of water continuously taken from a body of water.

The search for petroleum has, in recent years, been extended to include water covered areas such as the continental shelf surrounding the United States, especially in the Gulf of Mexico. Various geophysical and geological methods of exploration have been developed for such exploration. A rather recent system used in such exploration is the so-called gas seepage method wherein an apparatus is placed on a boat which traverses the surface of the body of water. A sample of water is continuously taken and analyzed for hydrocarbons. The gas dissolved in the sea water is separated and analyzed to determine the quantity of gas or hydrocarbons present. If there is an abnormal amount of hydrocarbons present, it is likely caused by seepage from the underground deposit. It is generally accepted in the industry that methane, for example, sometimes seeps from subsurface deposits to the surface of the earth. Although the mechanism of such seepage or migration is not definitely known, it is believed by many that such constituents seep to the surface along a fault line or other fracture pattern. Statistical correlation of producing reservoirs with seeps has shown that seeps are extremely valuable indicators of sub-surface petroleum deposits. This is discussed in U.S. Patent 2,918,579, for example.

Brief description of invention

This invention concerns a sea water sampling system having a gas breakout system and a system for analyzing the gas thus broken out. This entire system is mounted on a boat which traverses a selected pattern on a body of water. The gas breakout system includes an aspirator which reduces the pressure of the flowing stream of water to a partial vacuum, e.g., 25 in. of Hg. This causes dissolved gases in the sea water to break out in the form of small bubbles. The water stream from the aspirator carries the gas bubbles to a separator where the gas rises to the top and the degassed water flows out the bottom. The gas which is collected at the top of the separator is conveyed to a detector to determine the presence and amount of hydrocarbons.

Specific description

Various objects and a better understanding of the invention can be had from the following description taken in conjunction with the drawing in which:

FIGURE 1 illustrates principal components in the apparatus of this invention mounted on the deck of a ship;

FIGURE 2 illustrates in more detail the relationship of the separator, standpipe, and the height of the water level in the separator.

Shown thereon is a boat having deck 10 and which is floating on a body of water 12. A sample of sea water is obtained through a water loop which begins with an inlet or down-pipe tubing 14 which extends downwardly into the body of water 12. The tube 14 alternatively can be connected to a valve, not shown, at the sea chest in the bottom of the boat. After processing, the degassed water is returned to the body of water 12 through discharge line 16. The discharged water should be discharged at a point removed from the intake and thus preferably toward the stern. The inlet to intake pipe 14 is provided with a screen 15 or other filter to keep out fish, etc. Intake pipe 14 is connected to a filter 18 which can be composed of an 8-mesh screen surrounded by a 100-mesh screen. Filter 18 is connected to a pump 20 which is the only pump needed for forcing the water through the system. The outlet of pump 20 goes through a water flowmeter 22 which indicates the amount of water flowing through the system. Ordinarily it would be desired that this quantity of water be kept constant for correlating purposes. It is to be understood that it is the quantity of hydrocarbons, e.g., methane, per volume of gas separated from the water which gives a meaningful indication.

I shall next consider the degassing portion of the water loop. This includes an aspirator 24 which is connected to the output of water meter 22. A suitable aspirator is commercially available from W. H. Curtin and Company, Houston, Tex. and is described as their Model 7887C. The aspirator is used to create a high vacuum (25 to 30 inches of mercury, for example). The high vacuum in the aspirator causes any dissolved gases in the sea water to break out in the form of small bubbles. A pressure gauge 26 is provided and is connected through line 28 to the aspirator. This is used for determining the vacuum in the aspirator. Line 28 has a side line 30 which has a valve 32. If desired, air can be bled or injected through valve 32, when open, into the aspirator. This small amount of air which is injected into the water through the vacuum connection in the aspirator augments the nucleation and scrubs the broken-out gases.

It is preferred to operate the system by admitting a small amount of air through the vacuum connector in the aspirator. A typical amount of air is about 0.5 cubic foot per hour when pumping sample water at the rate of 4½ gallons per minute, with an aspirator of the proper size to have a vacuum of 25 inches of mercury.

The outlet of the aspirator is connected to a separator 34. As the water leaves the aspirator, the gas is no longer dissolved therein but rather is in the form of small bubbles, that is, there is a two-phase system. The gas bubbles rise to the top of separator 34 in space 36, as shown in FIGURE 2, and the degassed water flows out the bottom through pipe 38 into a standpipe 40. The output from aspirator 24 flows directly into separator 34 and sprays tangentially outward through ports 84 of vertical cap 46 which is connected to inlet pipe 48. A foam filter 80 in the separator collects small bubbles of gas which grow until they are large enough to rise to the top of the separator. This filter 80 can be a 60 pore per inch "foam" type filter material (i.e., 60 holes per linear inch of foam material) placed over woven wire plate 82. Sealing means are provided between the outer periphery of filter 80 and the interior of the shell of the separator. Another seal is provided between the center hole in filter 80 and cap 46.

A ball 44, preferably of polypropylene, floats in the water in the separator and seals into the upper part of the cone to prevent water entering the gas system if the water level in the separator rises too high. Suitable means are also provided to prevent formation of foams which can enter the gas system. This can conveniently be a small cup 78 placed on deflector 46. A sponge saturated with anti-foam solution is placed in the cup 78.

The degassed water flows into standpipe 40 which contains a series of baffles (not shown) to reduce surging induced by heave of the ship. The top of standpipe 40 has vent 50 to the atmosphere which aids in preventing surging due to the siphon effect of the exhaust outlet 52 which is connected to the side of standpipe 40 near its top. Outlet 52 is connected to hose 16 which returns the degassed water to the ocean.

The gas which collects at the top of the separator 34 leaves the top through outlet pipe 54. There, the gas spills into two streams: one into the bypass gas line 56 and the other into the sample gas line 58.

Attention is next directed to that part of the system which maintains or controls the pressure of the gas in the top of the separator. The bypass gas flows preferably through a water trap, not shown, and through goose neck stinger 60 into the water in standpipe 40. The stinger level at point 62 in the standpipe controls the water level 64 in the separator. The level of the water in the separator may be adjusted by moving the end of the stinger up or down. The gas pressure in the separator is thus equal to the water head between the stinger level, at point 62, and the standpipe overflow level at outlet 52.

The sample gas line 58 is fed to a gas detector such as a flame ionization detector 70 which are commercially available. As is well known, it is necessary to introduce hydrogen with the gas to be analyzed into such flame ionization detector. Thus, a hydrogen generator 72 is provided with outlet line 74 connecting into sample line 58. Thus, the hydrogen mixes with the sample gas before it enters a detector 70. A recorder 76 is associated with the detector 70 and records the value of the detected gas. The operation of an ionization detector is well known; therefore, only a few comments have been made thereon. An ionization chamber or detector contains a burner and the flame is centered in a cylindrical signal pickup. An incandescent filament igniter is near the burner. Except during ignition, the filament and igniter leads carry a negative 200 volt DC polarization voltage. The hydrogen flame, which is fed hydrogen by the hydrogen generator is hot enough to break the carbon-hydrogen bond so that, when hydrocarbon is present, the flame is surrounded by a sheath of ionized gas. A small current will then flow to the signal pickup through the ionized gas due to the high polarization voltage. This minute current is detected by an electrometer and is amplified and recorded on a recorder 76.

This system is continuously in operation while the boat takes a prescribed course. As the boat 10 traverses its survey pattern, water is continuously taken in through intake 14 and passed through the degassing equipment and returned through outlet 16. The separated gas from separator 34 is continuously passed through sample gas line 58 to detector 70 where sampled gas is continuously analyzed. The navigator of the boat furnished a concurrent chart showing both boat path and timed fixes. Basic information on the chart record of recorder 76 includes the date, time, scale, any required calibration and the seep gas indications detected by the detector 70. By knowing the ship's course and time, one can then take the record from recorder 76 which has seep indications and times recorded thereon. From these one can match the time and prepare a basic map showing quantities of seep indications at proper locations indicated on the map.

While the above embodiment has been shown with considerable detail, various modifications thereof can be made without departing from the spirit and scope of the invention.

I claim:

1. An apparatus for use on a boat for removing dissolved gases from a body of water supporting the boat which comprises:
   pump means for obtaining a continuous sample of water from said body;
   an aspirator means connected to said pump means for reducing the pressure in the sample of water causing dissolved gases in the water to come out of solution and form bubbles;
   a separator means connected to said aspirator downstream from said pump means, said separator having a gas collecting outlet at the top thereof and a water outlet at the lower end;
   a gas detector with means connecting the outlet of said separator means to said gas detector;
   means for maintaining constant the pressure of the gas in the upper portion of said separator means.

2. An apparatus as defined in claim 1 in which said aspirator means includes means for admitting air into the sample of water flowing therethrough.

3. An apparatus for use on a boat for removing dissolved gases from a body of water supporting the boat which comprises:
   pump means for obtaining a continuous sample of water;
   an aspirator connected to said pump means for reducing the pressure, below atmospheric, in the sample of water causing the dissolved gases to form bubbles;
   a separator means having its inlet connected to said aspirator, said separator having a gas collecting outlet at the top thereof and a water outlet at the lower end;
   a standpipe;
   means connecting the lower end of said separator to the lower portion of said standpipe;
   a gas detector;
   separated gas conduit means connecting the output of said sample outlet of said separator to said detector;
   a stinger means in said standpipe;
   bypass means connecting said stinger to said separated gas conduit;
   exhaust means near the top of standpipe for exhausting water back to the body of water.

4. An apparatus as defined in claim 3 including a vent to atmosphere at the upper end of said standpipe.

5. An apparatus as defined in claim 4 including a floating sealing ball means in said separator which floats on the surface of the water and is of a size to seal the outlet of said separator.

6. An apparatus as defined in claim 5 including a foam filter in said separator between the inlet and water outlet.

7. An apparatus as defined in claim 6 including means for providing anti-foam solution within said separator.

8. An apparatus as defined in claim 3 including means for admitting a predetermined amount of air to the water stream through the aspirator.

9. An apparatus as defined in claim 4 including an upright conduit means in said separator and connected to the inlet of said separator, the upper end of said upright conduit means being closed and the wall near said upper end containing non-radial ports therethrough;
   a foam filter disc means having a hole in the center thereof placed about said upright conduit means below said port means, said foam filter disc having no fewer than about 60 pores per inch, said filter disc means forming a seal between the center hole of said foam filter and the wall of said upright conduit means and a seal between the periphery of said foam filter and the interior of said separator;

support means for holding said foam filter disc means in place.

10. An apparatus as described in claim 9 including an open container supported on the top of said upright member, said container having a defoaming agent therein.

11. A separator for use with an apparatus for removing dissolved gases from a body of water which comprises:

a shell means having an inlet conduit means including an upright member closed at the upper end and the wall of said conduit means near said upper end containing non-radial ports therethrough;

gas outlet means in the top of said shell means;

a foam filter disc means having a hole in the center thereof placed about said upright conduit means below said port means, said foam filter disc having no fewer than about 60 pores per inch, said filter disc means forming a seal between the center hole of said foam filter and the wall of said upright conduit means and a seal between the periphery of said foam filter and the interior of said separator;

support means for holding said foam filter in place;

outlet means in the wall of said shell means below said foam filter disc means.

12. An apparatus as described in claim 11 including an open top container supported on the top of said upright member of said inlet conduit means, said container having a sponge-like member therein saturated with a defoaming agent.

References Cited

UNITED STATES PATENTS

| | | | |
|---|---|---|---|
| 2,762,756 | 9/1956 | Kinnaird | 261—16 X |
| 2,918,579 | 12/1959 | Slobod et al. | 250—43.5 |
| 2,937,141 | 5/1960 | Helwig | 261—76 X |
| 3,116,133 | 12/1963 | Gates | 55—190 X |
| 3,296,776 | 1/1967 | Youngman | 55—203 X |
| 3,364,727 | 1/1968 | Heath | 73—23 |

REUBEN FRIEDMAN, Primary Examiner

R. W. BURKS, Assistant Examiner

U.S. Cl. X.R.

23—230, 232, 254; 55—190, 201; 73—23, 170; 261—2, 76